United States Patent [19]

Takahashi et al.

[11] Patent Number: 5,261,455
[45] Date of Patent: Nov. 16, 1993

[54] PRESSURE CONTROL VALVE FOR ACTIVE SUSPENSION CONTROL SYSTEM

[75] Inventors: Kenro Takahashi; Naohiko Inoue, both of Kanagawa, Japan

[73] Assignee: Nissan Motor Company, Ltd., Japan

[21] Appl. No.: 792,481

[22] Filed: Nov. 15, 1991

[30] Foreign Application Priority Data

Nov. 30, 1990 [JP] Japan .................................. 2-334153

[51] Int. Cl.⁵ ............................................ F15B 13/043
[52] U.S. Cl. ................................. 137/625.64; 91/433
[58] Field of Search ...................... 91/433; 137/625.64

[56] References Cited

U.S. PATENT DOCUMENTS

| 3,286,734 | 11/1966 | Hartshorne | 137/625.64 |
|---|---|---|---|
| 4,527,592 | 7/1985 | Dotti et al. | 137/625.64 |
| 4,615,358 | 10/1986 | Hammond et al. | 137/625.64 X |
| 5,031,663 | 7/1991 | Fukuta et al. | 137/625.64 |
| 5,042,832 | 8/1991 | Takahashi et al. | 137/625.64 X |
| 5,048,861 | 9/1991 | Takahashi | 280/707 |

FOREIGN PATENT DOCUMENTS

| 61-102972 | 7/1986 | Japan . | |
|---|---|---|---|
| 61-169915 | 7/1986 | Japan | 137/625.64 |
| 63-236110 | 10/1988 | Japan | 137/625.65 |
| 1-116813 | 8/1989 | Japan . | |
| 1-199081 | 8/1989 | Japan | 137/625.64 |
| 2093223 | 8/1982 | United Kingdom | 137/625.64 |

Primary Examiner—Gerald A. Michalsky
Attorney, Agent, or Firm—Lowe, Price, LeBlance & Becker

[57] ABSTRACT

A pressure control valve for adjusting a controlled pressure supplied to an actuator includes first and second valves. The first valve serves to modify a pressure level of a working fluid supplied from a fluid pressure source to a preselected level and provides it to the actuator. The second valve is responsive to a control signal commanding elevation or reduction in the controlled pressure from a controller to adjust a supply pressure level from the fluid pressure source to provide a pilot pressure, elevated or reduced to a preselected level, to the first valve for activating same. When elevating or reducing the pilot pressure, the second valve decreases the supply pressure level from the fluid pressure source by a preselected degree, for balancing a flow gain when elevating the pilot pressure with that when reducing the pilot pressure, for providing uniform response for elevation and reduction of the controlled pressure to the actuator.

10 Claims, 5 Drawing Sheets

PRESSURE CONTROL VALVE FOR ACTIVE SUSPENSION CONTROL SYSTEM

BACKGROUND OF THE INVENTION

1. Field of the Invention

The present invention relates generally to a pressure control valve for an active suspension control system of an automotive vehicle. More specifically, the invention relates to pressure control valve arrangements which include an electromagnetic proportional pressure reducing valve as a pilot valve and a pressure reducing valve as a main valve which is activated by a pilot pressure output from the pilot valve.

2. Description of the Background Art

Japanese Utility Model Publication Nos. 1-116813 and 61-102972 assigned to the owner of this application disclose a typical pressure control valve for an active suspension system. The pressure control valve of the Publication No. 1-116813 includes generally a three-way spool valve as a main valve and an electromagnetic proportional relief valve type pilot valve. The main valve comprises a supply port connected to a hydraulic power source which incorporates a pump and a reservoir tank, a return port, and an output port connected to a suspension actuator. The pilot valve is operable to provide a pilot pressure to an end of a spool of the main valve. To the other end of the spool, a controlled pressure from the output port is fed back for adjusting the controlled pressure dependent upon the pilot pressure.

In the pressure control valve of the Publication No. 61-102972, a controlled pressure is fed back to an end of a spool of a three-way spool valve, while a pilot pressure is supplied to the other end of the spool, thereby producing the controlled pressure of a pressure level determined by the pilot pressure which varies in proportion to thrust of a proportional solenoid. The pilot pressure is provided by a pressure reducing valve which blocks flow input when providing no pilot pressure.

However, the prior art pressure control valve of the Publication No. 1-116813 is arranged such that a hydraulic fluid always flows in the pilot valve, resulting in great consumption of a useless pilot flow rate. Especially, when a control range is made wider, or a supply pressure is elevated to a high level, the useless consumption of the pilot flow rate is extremely increased. Therefore, energy efficiency is degraded and fuel consumption of a vehicle is increased.

Further, the pressure control valve of the Publication No. 61-102972 is arranged such that the main valve directs a supply pressure to the pilot valve. When a supply flow rate to the pilot valve is increased for enhancing response of the pilot valve, a controlled pressure output from the main valve tends to vary due to vibration input from a road surface. This results in unstable control of the pilot valve. Therefore, achievement of response and stability of system control is practically difficult.

For avoiding the above disadvantages, it may be proposed that a supply pressure from a hydraulic power source is modified by an electromagnetic three-way spool valve to provide a pilot pressure. However, in such arrangements, response when increasing a controlled pressure is different from that when decreasing it. Another problem occurs in that regulation of a controlled pressure is difficult.

SUMMARY OF THE INVENTION

It is therefore a principal object of the present invention to avoid the disadvantages of the prior art.

It is another object of the invention to provide a pressure control valve which serves to reduce flow rate consumption of working fluid in a suspension system, improves control response and stability against external disturbances, and provides uniform response during increase and decrease in controlled pressure.

According to one aspect of the present invention, there is provided a pressure control valve which is operable to adjust controlled pressure for an actuator. This valve comprises a first valve for providing controlled pressure to the actuator and a second valve for providing a pilot pressure for activating the first valve. The first valve includes supply, output, and return ports, the supply and return ports being adapted to be communicated with a fluid pressure source, the output port being adapted to be communicated with the actuator. The first valve further includes a spool in a valve bore thereof and first and second pressure chambers, the spool being arranged at first or second spool positions according to a pressure level difference between the first and second pressure chambers. The first spool position communicates between the supply and output ports for modifying a pressure level of working fluid supplied from the fluid pressure source to elevate the controlled pressure to the actuator, the second spool position communicates between the output and return ports for discharging pressure output from the output port through the return port to reduce the controlled pressure to the actuator. The second valve includes pilot supply, output, and return ports, the pilot supply and return ports being communicated with the supply and return ports of the first valve, the pilot output port being communicated with the first pressure chamber of the first valve. The second valve further includes a pilot spool in a valve bore thereof which is responsive to a control signal output from a controller to be arranged at first and second pilot spool positions, the pilot spool being responsive to the control signal commanding elevation in the controlled pressure to be arranged at the first pilot spool position to communicate between the pilot supply and output ports to receive working fluid from the fluid pressure source at a first flow rate through the pilot supply port for providing pilot pressure increased toward a first preselected level at a first flow gain to the first pressure chamber of the first valve through the pilot output port to arrange the spool of the first valve at the first spool position to provide controlled pressure elevated dependent upon the first preselected level of the pilot pressure. The pilot spool is further responsive to a control signal commanding reduction in the controlled pressure to be arranged at the second pilot spool position to communicate between the pilot output and return ports to discharge the working fluid output from the pilot output port at a second flow rate through the pilot return port for providing pilot pressure decreased toward a second preselected level, at a second flow gain, to the first pressure chamber of the first valve to arrange the spool of the first valve at the second spool position to provide controlled pressure decreased dependent upon the second preselected pilot pressure level. The pressure control valve further comprises means for providing the first flow rate of the working fluid supplied through the pilot supply port smaller than the second flow rate of the working fluid discharged from the pilot return port for balancing the first and second flow gains with each other for providing uniform response in elevation and reduction of the controlled pressure to the actuator.

In the preferred mode, the pilot spool of the second valve is responsive to a control signal commanding elevation in the controlled pressure to be displaced in a first direction from a third pilot spool position, where the pilot spool blocks both pilot supply and return ports, to open the pilot supply port by a first opening area at the first pilot spool position to establish communication between the pilot supply and output ports. The pilot spool of the second valve is further responsive to a control signal commanding reduction in the controlled pressure to be displaced in a second direction, opposite the first direction from the third pilot position, to open the pilot return port by a second opening area at the second pilot spool position to establish communication between the pilot return port and output port. The means is adapted to provide a variation rate in the first opening area relative to the displacement of the pilot spool in the first direction smaller than that in the second opening area relative to the displacement of the pilot spool in the second direction.

Alternatively, the means may include an orifice which is disposed between the supply port of the first valve and the pilot supply port of the second valve for restricting the first flow rate below a preselected degree.

BRIEF DESCRIPTION OF THE DRAWINGS

In the drawings:

FIG. 4 (b) is a graph which shows a relation of a controlled pressure $P_c$ relative to variation in pilot pressure $P_p$.

DESCRIPTION OF THE PREFERRED EMBODIMENT

Figure 1:
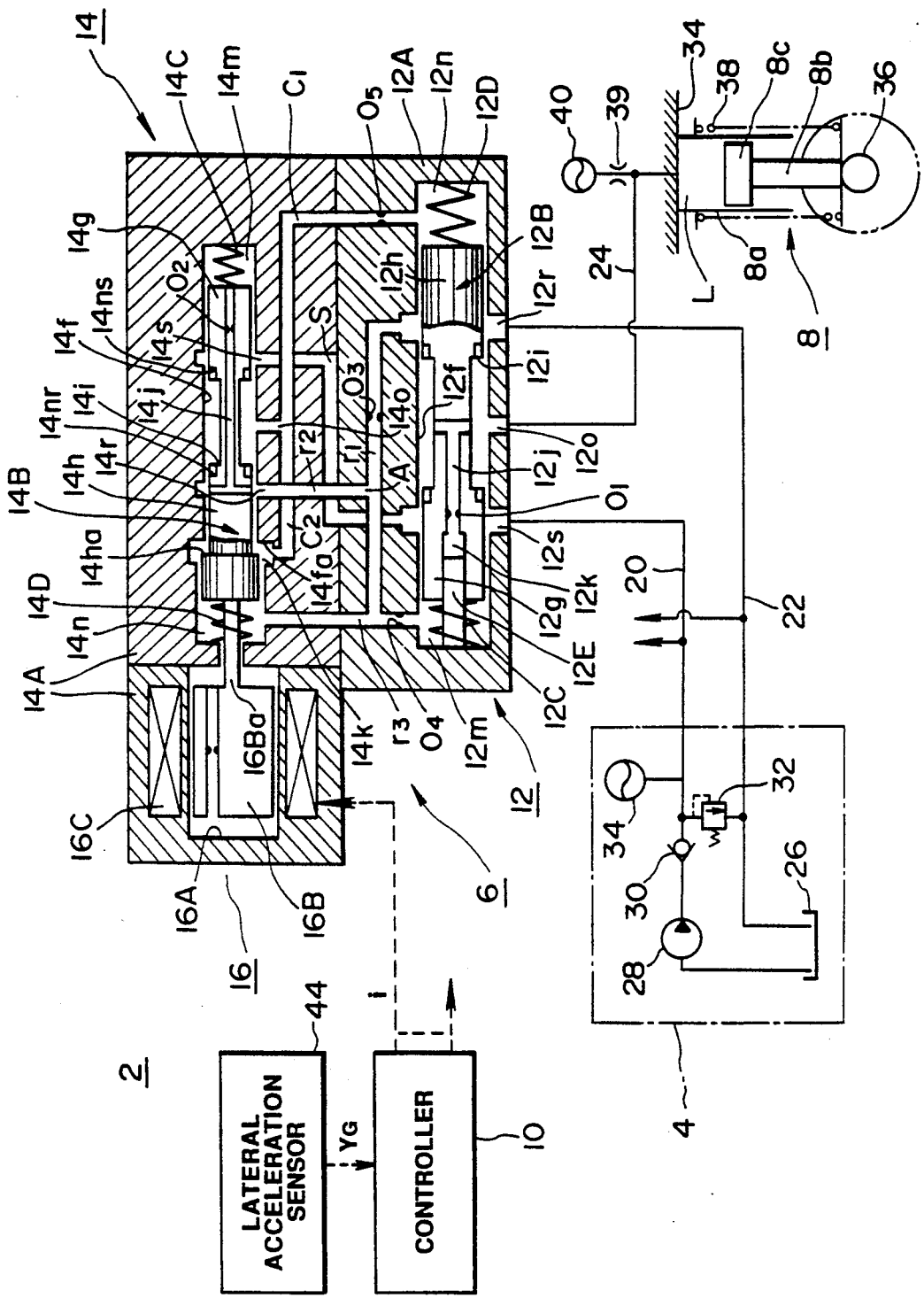
FIG. 1 is a block diagram which shows an active suspension control system incorporating a pressure control valve of the present invention.

Referring now to the drawings, particularly to FIG. 1, an active suspension control system 2 according to the present invention is shown which is operable to effect suspension control for regulating a vehicular height level and vehicular attitude change.

The active suspension control system 2 includes generally a hydraulic power source 4 as a pressure source, a pressure control valve 6, a hydraulic cylinder 8 functioning as an active suspension actuator, a lateral acceleration sensor 44, and a controller 10. Practically, the system includes a plurality of pressure control valves and hydraulic cylinders associated with respective vehicle wheels, however, in the drawing, only one valve and cylinder are shown for the sake of simplicity. The hydraulic source 4 provides pressurized working fluid such as hydraulic fluid. The pressure control valve 6 is responsive to a command signal from the controller to reduce hydraulic pressure from the hydraulic power source and supplies it to the hydraulic cylinder 8 for activation.

The pressure control valve 6 includes a main valve 12 and a pilot valve 14 which supplies pilot pressure to the main valve. These valves 12 and 14 are designed as a three-way spool pressure reducing valve. Valve housings or bodies 12A and 14A for the valves 12 and 14 are integrally attached to each other.

The main valve 12 includes the valve body 12A, a main spool 12B arranged in the body, springs 12C and 12D facing end surfaces of the spool respectively, and a feedback pin 12E inserted into an end portion of the main spool 12B. In detail, the main body 12A includes a cylindrical bore, valve bore 12f, which extends longitudinally therein and is closed at both ends. In the bore 12f, the main spool 12B is disposed slidably in an axial direction. Additionally, the main body 12A includes a supply port 12s, an output port 12o, and a return port 12r each communicating with the valve bore 12f. The main spool 12B includes lands 12g and 12h which are arranged at end portions thereof and a cylindrical groove 12i, in the central portion defined between the lands 12g and 12g, extending circumferentially. The main spool 12B further includes a hydraulic passage 12j extending in the land 12g which communicates between an end of the land 12g and the cylindrical groove 12i. The hydraulic passage 12j becomes greater in diameter from the center portion of the land 12g to the end portion thereof. This greater portion defines a feedback hydraulic pressure chamber 12k. In the hydraulic passage 12j, an orifice 01 is provided. A feedback pin 12E is attached to an end wall of the bore 12f at its end and inserted into the hydraulic feedback chamber 12k to slide relatively therein. It will be noted that displacement of the spool 12B causes volume of the feedback hydraulic pressure chamber 12k to vary. A pressure receiving area of the feedback hydraulic pressure chamber 12k, on which the feedback pressure acts, is smaller than a pressure receiving area of an end of the spool 12B by a preselected degree.

Defined between the ends of the main spool 12B and the end wall of the bore 12f are end hydraulic pressure chambers 12m and 12n. The chamber 12n functions as a pilot hydraulic pressure chamber. Springs 12c and 12d are arranged in the end hydraulic chambers 12m and 12n respectively. The springs 12c and 12d each have a preselected spring constant required to urge the spool 12B to a neutral or central position in the bore 12f. The spring 12C is arranged to receive a portion of the feedback pin 12E projected from the end of the land 12g therein. When the main spool 12B is located at the neutral position, the lands 12g and 12h block the supply and return ports 12s and 12r respectively.

The pilot valve 14 includes a pilot valve body 14A, a pilot spool 14B disposed in the valve body, springs 14C and 14D arranged on ends of the pilot spool, and a proportional solenoid 14E for thrusting the pilot spool 14B.

The pilot valve body 14A includes a cylindrical bore, or valve bore 14f which extends longitudinally therein and is closed at both ends. In the bore 14f, the pilot spool 14B is provided to be slidably movable in an axial direction. Additionally, the pilot valve body 14A includes a pilot supply port 14s, a pilot output port 14o, and a pilot return port 14r each communicating with the valve bore 14f.

The pilot spool 14B includes lands 14g and 14h which are arranged at both end portions thereof and a cylindrical groove 14i in the central portion thereof extending circumferentially. The pilot spool 14B further includes an internal hydraulic passage 14j extending through the lands 14g and 14h, communicating between the pilot return port 14r and the end of the land 14g. An orifice 02 is arranged in the hydraulic passage 14j.

The land 14h includes a greater diameter section and smaller diameter section to form a shoulder 14ha. The greater diameter section makes contact with the solenoid 16 on its end surface. Additionally, the valve bore 14f becomes greater in diameter for receiving the greater diameter section of the land 14h, forming a shoulder 14fa. Between the shoulders 14a and 14fa, a pilot feedback hydraulic pressure chamber 14k is defined, the volume of which is variable dependent upon displacement of the pilot spool 14B.

Defined between the ends of the pilot spool 14B and the end wall of the valve bore 14f, are end hydraulic pressure chambers 14m and 14n. The springs 14c and 14d are arranged in the end hydraulic pressure chambers 14m and 14n respectively. The springs 14C and 14D have a preselected spring constant required to bias the spool 12B to a neutral or central position in the valve bore 14f. When the pilot spool 14B is located at the neutral position, the lands 14g and 14h block the pilot supply and pilot return ports 14s and 14r respectively.

The valve body 14A, the pilot spool 14B, the springs 14C and 14D, and the valve bore 14f constitute a three-way pilot spool valve.

For a relation of communication between the main valve 12 and the pilot valve 14, a hydraulic passage S fluidly connects the supply port 12s of the main valve and the pilot supply port 14s of the pilot valve. A hydraulic passage r1 fluidly connects the return port 12r of the main valve and the end hydraulic pressure chamber 12m. The hydraulic passage r1 is also communicated with the pilot return port 14r of the pilot valve 14 and the end hydraulic pressure chamber 14n at different positions through hydraulic passages r2 and r3 respectively. Further, a hydraulic passage c1 communicates between the end hydraulic pressure chamber 12n of the main valve 12 and the pilot output port 14o of the pilot valve 14. The pilot output port 14o is then communicated with the pilot feedback chamber 14k through a hydraulic passage c2. Orifices 03 and 04 are provided in the hydraulic passage r1. The orifice 03 is arranged at a position close to the return port 12r, opposite a junction with the passage r2. The orifice 04 is arranged at a position close to the end hydraulic pressure chamber 12m, opposite a junction with the passage r3. Additionally, an orifice 05 is arranged in the hydraulic passage c1 adjacent the end hydraulic pressure chamber 12n.

The proportional solenoid 16 includes a plunger 16B and an exciting coil 16C. The plunger 16B is displacable through a bore 16A formed in a solenoid housing of the pilot valve body 14A. The exciting coil 16C is accommodated in the solenoid housing. The plunger 16B includes an actuating element 16Ba attached thereto which extends into the end hydraulic pressure chamber 14m through a hole formed in a wall between the bores 14f and 16A so that a tip portion urges the pilot spool 14B in cooperation with the spring force of the spring 14C. The controller 10 outputs a preselected current, or a command signal i to the exciting coil 16C so that the plunger 16B thrusts the pilot spool 14B in an axial direction thereof by a degree proportional to a value of the command signal i for controlling pilot pressure.

Figure 2:
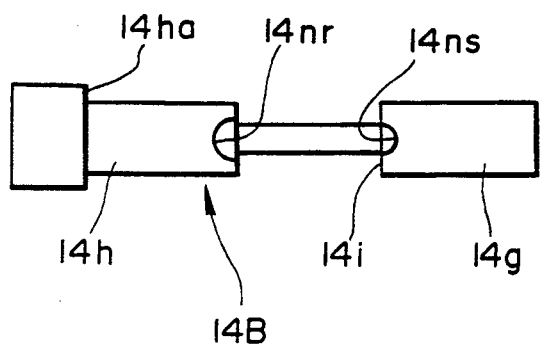
FIG. 2 is a side view which shows a spool structure of a pressure control valve.
Figure 6:
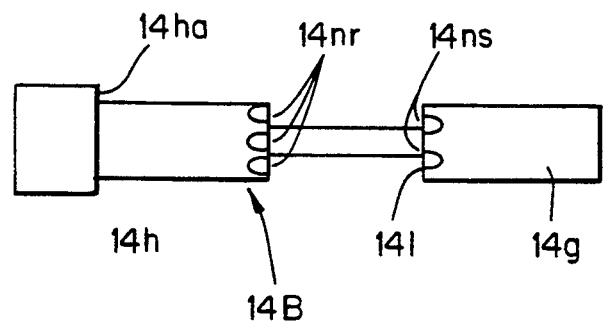
FIG. 6 is a side view of a spool structure of a pressure control valve, having different numbers of notches on the lands of the spool.

Referring to FIG. 2, the pilot spool 14B is shown. The pilot spool 14B includes a plurality of semicircular notches 14ns and 14nr which are formed in edge portions of the land 14g and 14h respectively and extend circumferentially at regular intervals. The notches 14ns and 14g face the pilot supply port 14s and the pilot return port 14r respectively, dependent upon displacement of the pilot spool 14B. The number of the notches 14ns are the same as that of the notches 14nr and the notches 14nr are larger than the notches 14ns by a preselected degree for equalizing flow gains when increasing and decreasing pilot pressure, as described hereinafter in detail. Alternatively, the size of the notches 14ns may be the same as that of the notches 14nr with the same number thereof, and in yet another variation the number of notches 14ns may be made smaller than the number of notches 14nr as best seen in FIG. 6.

The following are reasons for providing different sizes, or diameters, between the notches 14ns and 14nr in order to equalize flow gains when increasing or decreasing pilot pressure.

Assuming that a level of pressure supplied to the pressure control valve 6 is 150 kgf/cm², a pressure controlled by the pressure control valve ranges from 15 to 150 kgf/cm², and the pressure control valve 6 of the present invention is designed to intensify pilot pressure to provide a controlled pressure. The pressure intensification rate of the controlled pressure to the pilot pressure is five times. Therefore, it will be noted that a pilot pressure ranging from only 3 to 30 kgf/cm² is adequate for activating the pressure control valve 6.

Hereinbelow, an attempt is made to explain flow gain of a physical quantity.

If a pilot valve flow rate is $Q_P$, a supply pressure is $P_S$, a controlled pressure $P_C$, a pressure intensification rate of the controlled pressure to the pilot pressure is $\alpha$, opening areas respectively defined between the notches 14ns and 14nr and the supply and return ports 14s and 14r relative to a certain displacement of the pilot spool are $A_S$ (i.e., a supply port opening area when pilot pressure rises) and $A_r$ (i.e., a return port opening area when pilot pressure decreases), and a flow gain is $K_{XP}$, the pilot valve flow rate $Q_P$ is represented by the following equation.

$$Q_P \doteq K_{XP} \times X_P$$
$$= A_S (P_S - P_C/\alpha)^{\frac{1}{2}} \times X_P$$
(when increasing pilot pressure) (1)
$$= A_r (P_C/\alpha)^{\frac{1}{2}} \times X_P$$
(when decreasing pilot pressure) (2)

A dimensionless flow gain $K_{XP}'$ which provides a maximum gain ($K_{XP}$) of one when $\alpha = 1$ is given by the following equation.

$$K_{XP}' = \left( \frac{P_s - P_c/\alpha}{P_s} \right)^{\frac{1}{2}}$$
(when increasing pilot pressure) (3)
$$= \left( \frac{P_c/\alpha}{P_s} \right)^{\frac{1}{2}}$$
(when decreasing pilot pressure) (4)

Figure 3:
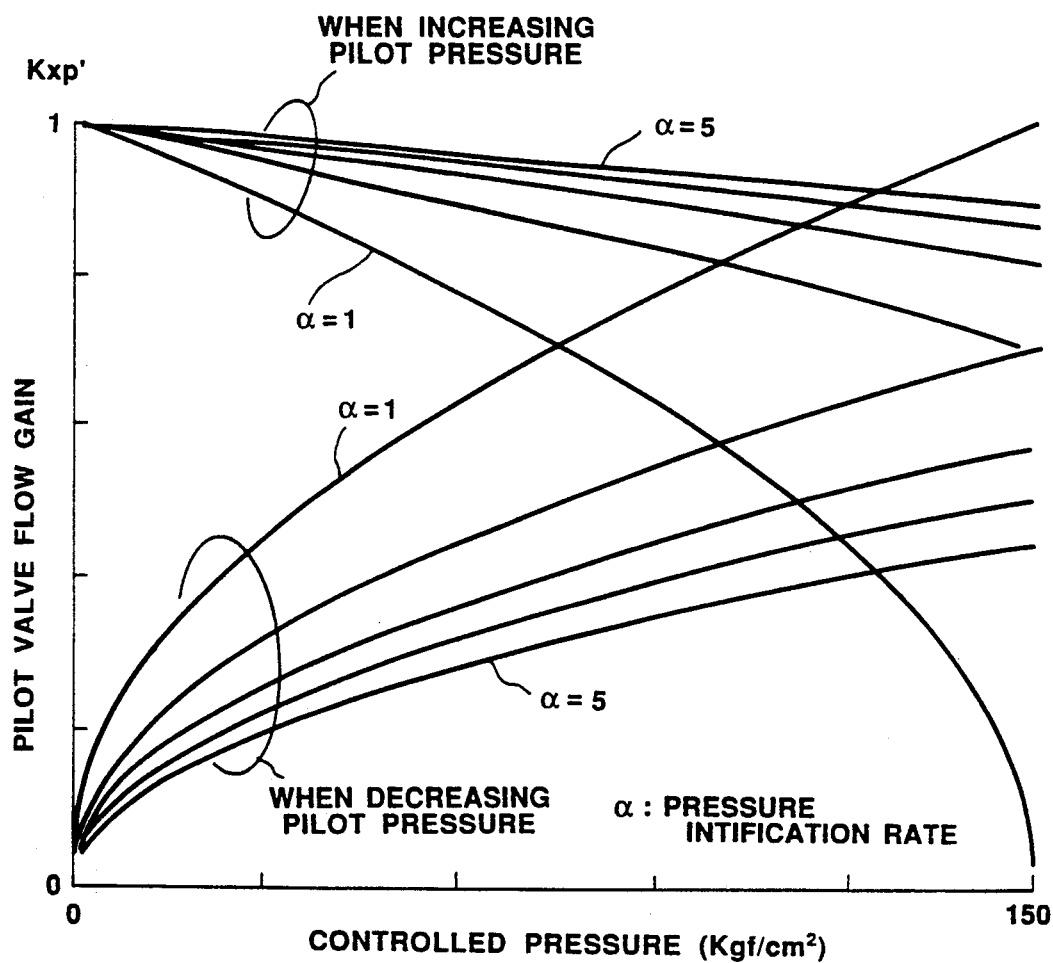
FIG. 3 is a graph which shows a relation between pilot flow gains when increasing and decreasing controlled pressure and, a controlled pressure output.

Referring to FIG. 3, graphs are shown which respectively represent flow gains $K_{xp}'$ when increasing and decreasing pilot pressure, when the pressure intensification rate $\alpha$ is greater than one. The graphs show that a difference in an absolute value between the flow gains $K_{xp}'$ of the pilot valve when increasing and decreasing pilot pressure become greater as the pressure intensification rate $\alpha$ is set to a greater value. It will be noted that the flow gain while pilot pressure is increasing is greater than the flow gain while pilot pressure decreases, as the pressure intensification rate $\alpha$ becomes great.

This shows that in the case of step response, a response of rising controlled pressure, or pilot pressure in the output port 14o is better than response thereof while pressure is falling.

In order to compensate the difference between the pilot pressure increasing flow gain and the pilot pressure decreasing flow gain, providing a value of $A_s$ smaller than that of $A_r$ ($A_s < A_r$) in the above equations (1) and (2) can be proposed. Here, the pilot pressure increasing and decreasing flow gains $K_{xp}$ can be also expressed by the following equations.

$$K_{xp} = C\left(\frac{2}{\rho}\right)^{\frac{1}{2}} \cdot \frac{\partial S_s(X)}{\partial X_p} \cdot (P_s - P_c/\alpha)^{\frac{1}{2}}$$

(when increasing pilot pressure) (5)

$$K_{xp} = C\left(\frac{2}{\rho}\right)^{\frac{1}{2}} \cdot \frac{\partial S_r(X)}{\partial X_p} \cdot (P_c/\alpha)^{\frac{1}{2}}$$

(when decreasing pilot pressure) (6)

Where C is a flow coefficient, $\rho$ is a density, $P_s$ is an supply pressure, $P_c$ is a controlled pressure, $\alpha$ is a pressure intensification rate, $X_p$ is a spool displacement, $S_s(X)$ is a spool communication area with the supply port relative to a spool displacement, $S_r(X)$ is a communication area of the spool with the return port relative to a spool displacement.

In the above equations (5) and (6), each of the terms $$\frac{\partial S_s(X)}{\partial X_p}, \frac{\partial S_r(X)}{\partial X_p}$$

expresses a variation in the communication area which is defined by a spool displacement.

Therefore, if a relation of $$\frac{\partial S_s(X)}{\partial X_p} < \frac{\partial S_r(X)}{\partial X_p}$$

is established, the pilot pressure increasing flow gain and the pilot pressure decreasing flow gain are equalized to each other.

For these reasons, a diameter of the notches 14nr for facing the return port 14r is made greater than that of the notches 14ns for facing the supply port 14s. In other words, a flow rate of a working fluid supplied to the pilot valve through the supply port 14s is made lower than that of a working fluid discharged from the pilot valve through the return port 14r to balance the pressure increasing flow gain with the pressure decreasing flow gain.

Referring back to FIG. 1, the pressure control valve 6 of the above arrangements is connected to the hydraulic power source 4 with fluid communication of the supply and return ports 12s and 12r through supply and return lines 20 and 22.

The hydraulic power source 4 includes a reservoir tank 26 for storing a working fluid such as hydraulic fluid, a hydraulic pump 28, a check valve 30, a relief valve 32, and an accumulator 34 arranged downstream from the relief valve. The hydraulic pump 28 is driven by the output torque of an internal combustion engine (not shown) and pumps the hydraulic fluid from the reservoir tank 26 to supply it to the supply port 12s of the pressure control valve 6 through the supply line 20. The check valve 30 is arranged in the supply line downstream from the hydraulic pump 28 for restricting backflow to the pump. The relief valve is arranged between the supply line 20 and the return line 22 leading to the return port 12r of the pressure control valve 6 and responsive to pressure in the line 20 which is greater than a preselected set level to feed this excess pressure to the return line 22 for maintaining a line pressure in the supply line at a constant level.

The hydraulic cylinder 8 is attached to a vehicle body 34 at an upper end of a cylinder tube 8a thereof. A piston rod 8b is connected to a suspension member 36 at its lower end. The hydraulic cylinder 8 includes a cylinder chamber L which is defined by a piston 8c disposed on an upper end of the piston rod 8b. The cylinder chamber L is fluidly communicated with the output port 12o of the pressure control valve 6 through an output line 24.

Between the vehicle body 34 and the suspension member 36, a coil spring 38 is disposed for supporting static load of the vehicle body. Additionally, an accumulator 40 is connected to the output line 24 through a throttle or orifice 38 for absorbing pressure variations of relatively high frequencies, within an unsprung resonance frequency range, which are transmitted to the cylinder chamber L.

The lateral acceleration sensor 44 serves to monitor lateral acceleration acting on the vehicle body to provide a signal $Y_G$ indicative of the magnitude of the lateral acceleration or rolling motion of the vehicle body to the controller 10. The controller 10 includes a micro-computer which is responsive to the signal $Y_G$ to multiply it by an anti-rolling control gain to provide the command signals i to the hydraulic cylinders 6 of wheels respectively.

In operation of the pressure control valve 6, when the command signal i supplied to the proportional solenoid 16 is zero so that the proportional solenoid 16 provides no thrust to the pilot spool 14B, variation in a return pressure in the return line 22 does not exist, and pressure in the cylindrical groove 14i of the pilot spool 14B is elevated, pressure in the feedback pressure chamber 14K communicating with the output port 14o through the internal hydraulic passage C2 is also elevated. This causes the pilot spool 14B to be displaced toward the proportional solenoid 16 (in a left direction as viewed in the drawing) to establish fluid communication between the cylindrical groove 14i and the return port 14r. Thus, the hydraulic fluid in the cylindrical groove 14i flows into the reservoir tank 26 through the return port 14r, the hydraulic passages r2, and r1, and the return port 12r of the main valve 12, thereby reducing a pressure level in the cylindrical groove 14i. This pressure reduction is continued until pressure in the feedback pressure chamber 14k reaches zero. When the pressure in the feedback pressure chamber 14k, or the feedback pressure becomes zero, the spring force of the springs 14C and 14D are balanced to arrange the pilot spool 14B at the neutral position so that the lands 14g and 14h block the supply and return ports 14s and 14r respectively, resulting in zero pilot pressure $P_p$ output from the output port 14o.

Subsequently, increasing a signal level of the command signal i to the proportional solenoid 16 causes the pilot spool 14B to be moved toward the supply port 14s (in the right direction of the drawings) proportional to the command signal level. The pilot supply port 14s is then communicated with the cylindrical groove 14i through the notches 14ns, allowing a pressurized hydraulic fluid of a high pressure level supplied to the supply port 12s of the main valve 12 to flow into the cylindrical groove 14i through the hydraulic passage s and the pilot supply port 14s. This results in elevated pressure in the cylindrical groove 14i with pressure in the feedback pressure chamber 14k rising. Upon elevating pressure in the pilot feedback pressure chamber 14k, the elevated pressure acts on the shoulder 14ha of the pilot spool 14B against thrust of the proportional solenoid 16, causing the pilot spool 14B to be pushed back to the proportional solenoid. When the pilot spool 14B reaches the neutral position, it blocks the supply and return ports 14s and 14r again. It will be noted that the pilot pressure $P_p$ in the output port 14o is increased according to a command signal level. The elevated pilot pressure is then supplied to the end hydraulic pressure chamber 12n of the main valve 12 through the internal hydraulic passage c1.

Afterwards, when the command signal level is increased further, the pilot spool 14B is displaced to the right again, opening the supply port 14s to increase the pilot pressure $P_p$ until pressure in the feedback pressure chamber 14k and thrust by the proportional solenoid 16 are balanced so that the pilot spool 14B is arranged at the neutral position to block the supply and return ports 14s and 14r. It will be noted that the pilot pressure $P_p$ is further elevated according to an increase in the command signal level input to the proportional solenoid 16.

On the other hand, reducing the signal level of the command signal i, while the pilot pressure $P_p$ is elevated at the above high level, causes thrust of the proportional solenoid 16 to be reduced by a degree of the reduction in the command signal level. Thus, the force acting on the shoulder 14ha of the pilot spool 14B created by the pressure in the feedback pressure chamber 14k overcomes the thrust of the proportional solenoid 16 to displace the pilot spool 14B to the left. The cylindrical groove 14i is then communicated with the pilot return port 14r through the notches 14nr of greater diameter to discharge the hydraulic fluid in the cylindrical groove 14i to the reservoir tank 26 through the pilot return port 14r, the internal hydraulic passages r2 and r1, and the return port 12r of the main valve 12. This discharge causes the pressure in the cylindrical groove 14i or pilot pressure $P_p$ to be reduced in level, thereby lowering the pressure in the feedback pressure chamber 14k to reduce the force acting on the pilot spool 14B. When the pressure in the feedback pressure chamber 14k and the thrust by the proportional solenoid 16 are balanced with each other, the pilot spool 14B is arranged at the neutral position to block the supply and return ports 14s and 14r. It will be appreciated that the pilot pressure $P_p$ output from the output port 14o is decreased by a degree of the reduction in the command signal level input to the proportional solenoid 16.

Figure 4A:
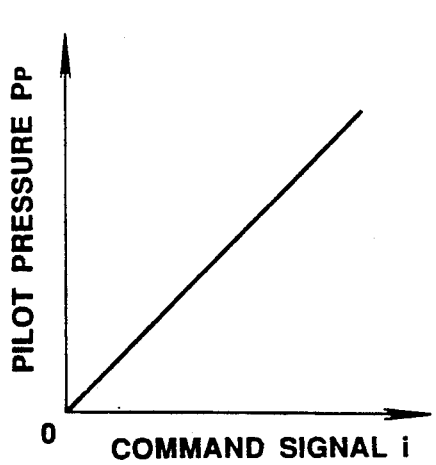
FIG. 4 (a) is a graph which shows a relation of a pilot pressure $P_p$ relative to variation in a command signal i.

Accordingly, it will be noted that the pilot valve 14 provides a pilot pressure $P_p$ of a level, variable dependent upon the command signal i as shown in FIG. 4(a), to the main valve 12. In the above operation for increasing and decreasing a pilot pressure $P_p$, absolute values of the pilot pressure increasing and decreasing flow gains $K_{xp}'$ are made uniform to each other by a difference between variations in the opening areas which are defined by the notches 14ns and 14nr and the supply and return ports 14s and 14r respectively, relative to a displacement of the pilot spool 14B. That is, provision of different sized notches 14ns and 14nr satisfying a relation of $\partial S_s(X)/\partial X_p < \partial S_r(X)/\partial X_p$.

In operation of the main valve 12, when the pilot valve 14 provides pilot pressure $P_p$ at a zero level ($P_p=0$), no variation in pressure in the return line 22 exists, and pressure in the cylindrical groove 12i of the main valve 12B, or controlled pressure $P_c$ output from the output port 12o is greater than zero, pressure in the feedback pressure chamber 12k acts on an end surface of the feedback pin 12E to cause the main spool 12B to be displaced toward the return port 12r, or to the right, establishing fluid communication between the cylindrical groove 12i and the return port 12r. Thus, the hydraulic fluid in the main valve 12 is discharged from the return port 12r to the reservoir tank 26. This causes the controlled pressure $P_c$ to be reduced. When the pressure in the feedback pressure chamber 12k becomes zero, the spring forces of the springs 12C and 12D are balanced to arrange the main spool 12B at the neutral position with the result that the lands 12g and 12h block the supply and return ports 12s and 12r respectively. It will be appreciated that when the pilot pressure $P_p$ is zero, the controlled pressure $P_c$ output from the main valve 12 is set to zero.

Subsequently, when the pilot pressure output from the pilot valve 14 is elevated toward a certain level, pressure in the end hydraulic chamber 12n (the pilot pressure chamber) rises according to the pilot pressure elevation to urge the main spool 12B to the left. This displacement of the main spool 12B accomplishes fluid communication between the spool cylindrical groove 12i and the supply port 12s. The pressurized hydraulic fluid from the hydraulic power source is input to the cylindrical groove 12i to elevate pressure therein. Thus, controlled pressure $P_c$ of a high level is output from the output port 12o to the hydraulic cylinder 8. Additionally, the elevated pressure in the cylindrical groove 12i is directed to the feedback pressure chamber 12k to elevate a feedback pressure, producing force to displace the main spool 12B back to the right. This causes the controlled pressure $P_c$ to rise until the force acting on an end surface of the main spool 12B created by the pilot pressure $P_p$ in the end hydraulic chamber 12n and the force acting on the feedback pin 12E created by the feedback pressure are balanced with each other. Upon balancing these forces, the main spool 12B is arranged at the neutral position where the main spool blocks the supply and return ports 12s and 12r and then the controlled pressure $P_p$ is set to a value which is given by intensifying the pilot pressure $P_p$ by a preselected pressure intensification rate $\alpha$.

After both ports 12s and 12r are blocked, further elevating the pilot pressure $P_p$ toward a preselected level causes the main spool 12B to be displaced to the left to establish fluid communication between the cylindrical groove 12i and the supply port 12s again. The controlled pressure $P_c$ is then further elevated according to a degree of the elevated pilot pressure $P_p$. After this, the main spool 12B is arranged at the neutral position again.

With the above elevated controlled pressure $P_c$, reducing the pilot pressure $P_p$ to a preselected level causes the pressure in the end hydraulic chamber 12n to be lowered. Thus, the main spool 12B is displaced to the right to communicate between the cylindrical groove 12i and the return port 12r, discharging the hydraulic fluid in the cylindrical groove 12i from the return port 12r to the reservoir tank 26. This causes the pressure in the feedback pressure chamber 12k and the controlled pressure $P_p$ from the output port 12o to be reduced. The main spool 12B is then displaced back to the left and stopped at the neutral position. The controlled pressure $P_p$ at this time is set to a value determined dependent upon the reduction in the pilot pressure $P_p$.

Figure 4B:
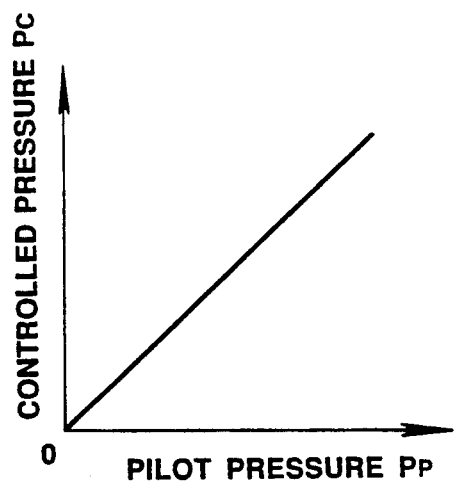

It will be appreciated that the main valve 12 provides a controlled pressure $P_p$ which is variable, as shown in FIG. 4(b), in proportion to variation in the pilot pressure $P_p$.

Therefore, varying a signal level of the command signal i to the proportional solenoid 16 causes the pressure control valve 6 to output a controlled pressure $P_p$ of a level in proportion to the variation in the command signal level.

When a controlled pressure $P_c$ from the output port 12o is increased extremely due to load variation while the pilot pressure $P_p$ is maintained at a constant static level, the increase in the controlled pressure $P_c$ causes pressure in the feedback pressure chamber 12k to rise, acting on the feedback pin 12E to overcome the pilot pressure $P_p$ for displacing the main spool 12B to the right. Thus, the return port 12r is opened to discharge the hydraulic fluid in the cylindrical groove 12i to the reservoir tank 26. In contrast to this, when the controlled pressure $P_c$ is decreased while maintaining the pilot pressure $P_p$ at the constant static level, the pressure in the feedback pressure chamber 12k is also reduced. The force acting on the main spool 12B of the pilot pressure $P_p$ is superior to that of the feedback pressure to urge the main spool 12B to the left, resulting in opening the supply port 12s to allow the hydraulic fluid from the hydraulic power source 4 to flow into the cylindrical groove 12i. With this operation, a variation in the controlled pressure $P_p$ corresponding to sprung resonance of a vehicle is absorbed by the displacement of the main spool 12B.

In operation of the active suspension system, when a vehicle travels straight at a constant speed, the lateral acceleration sensor 44 outputs a sensor signal $Y_G$ of a neutral value $Y_{GN}$ which indicates zero lateral acceleration to the controller 10. The controller 10 is then responsive to the signal from the lateral acceleration sensor 44 to provide command signals i of neutral values $i_N$ to the pressure control valves 6 of suspension units associated with wheels respectively. Each of the pressure control valves 6 provides a controlled pressure $P_p$ of a neutral level $P_{CN}$ pursuant to the command signal i of the neutral value $i_N$. This controlled pressure $P_p$ of the neutral level $P_{CN}$ is then directed into the cylinder chamber L of the hydraulic cylinder 8 to move the piston 8b by a preselected stroke for maintaining a vehicle height at a level orientation.

When the vehicle is turned to the right after traveling straight, the vehicle body rolls and lateral acceleration acts on the vehicle body. The lateral acceleration sensor 44 then monitors the lateral acceleration to output a sensor signal $Y_G$ indicative thereof. The controller 10 is responsive to the sensor signal $Y_G$ to provide command signals i to the pressure control valves 6 for front left and rear left wheels which are greater than the neutral value $i_N$ by a degree corresponding to the magnitude of the detected lateral acceleration and command signals i to the pressure control valves 6 for front right and rear right wheels which are smaller than the neutral value $i_N$ by a degree corresponding to the magnitude of the detected lateral acceleration. Therefore, the pressure control valves 6 associated with the outside wheels (the left wheels) provide controlled pressures $P_p$ which are elevated by a preselected level while the pressure control valves 6 associated with the inside wheels (the right wheels) provide controlled pressures $P_p$ which are elevated by a preselected level.

Therefore, the hydraulic cylinders 8 for the outside wheels produce forces against lowering the vehicle body, while the hydraulic cylinders 8 for the inside wheels produce forces preventing rising of the vehicle body by the reduced hydraulic pressure therein. It will be noted that momentum acts on the vehicle body in an anti-rolling direction to restrict rolling motion due to vehicle turning for maintaining the vehicle body at an even level.

When the vehicle is turned to the left, elevated controlled pressures $P_p$ are supplied to the hydraulic cylinders 8 for the right wheels reversely (the outside wheels) for effecting anti-rolling control in the same manner as that when the vehicle is turned to the right.

Further, if vibrations of relatively low frequencies within a range of unsprung resonance created by protrusions of a road surface are transmitted to the vehicle body from the wheels, cylinder pressures in the hydraulic cylinders 8 are varied dependent upon these vibrations. The pressure variations are, as mentioned previously, absorbed by displacement of the main spool 12B of the main valve 12. Additionally, vibration input of relatively high frequencies within a range of sprung resonance is absorbed by activity of the orifice 39 and the accumulator 40 before transmitted to the main valve 12.

With the above system arrangements, since absolute values of the flow gains $K_{xp}'$ of the pilot valve 14 when increasing and decreasing pilot pressure $P_p$ are suitably balanced with each other, rising and falling response of the controlled pressure $P_p$ is greatly improved.

Additionally, even when pressure in the return line 22 is varied by external disturbance, the variation in the back pressure is effectively damped by the orifice O3 in the hydraulic passage r1 before being directed to the end hydraulic chamber 12m of the main valve 12, the end hydraulic chambers 14m and 14n of the pilot valve 14, and the bore 16A storing the plunger 16B. This results in extremely stable operation of the pressure control valves 6.

It is well known in the art that provision of an orifice in a line leading to the return port 12r advantageously serves to secure stability of a pressure control valve against variation in back pressure. However, in valve arrangements such as the present invention, an optimum location of the orifice 03 is not known in the art. For example, in the present embodiment, arranging the orifice 03 in the hydraulic passage r3 connected to the end hydraulic chamber 14n of the pilot valve 14 is advantageous. Alternatively, arrangement in the hydraulic passage r2 connected to the pilot return port 14r is also preferable. Consequently, as a result of experiments by the present inventors, it has been found that effective location of the orifice 03 is, as shown in FIG. 1, a position between a junction A of passages leading to the hydraulic chambers 14n, 12m, 14m (14r) into which a return pressure acts and the return port 12r of the main valve 12 (i.e., in a portion of the hydraulic passage r1 adjacent to the return port 12r).

Additionally, the pilot valve 14 of the pressure control valve 6, according to the present invention, is provided with a spool type pressure reducing valve in place of a relief valve utilized in a conventional system, therefore, consumption of a flow rate of the pilot valve is low, resulting in improved fuel consumption for a vehicle in which the system is provided.

Figure 5:
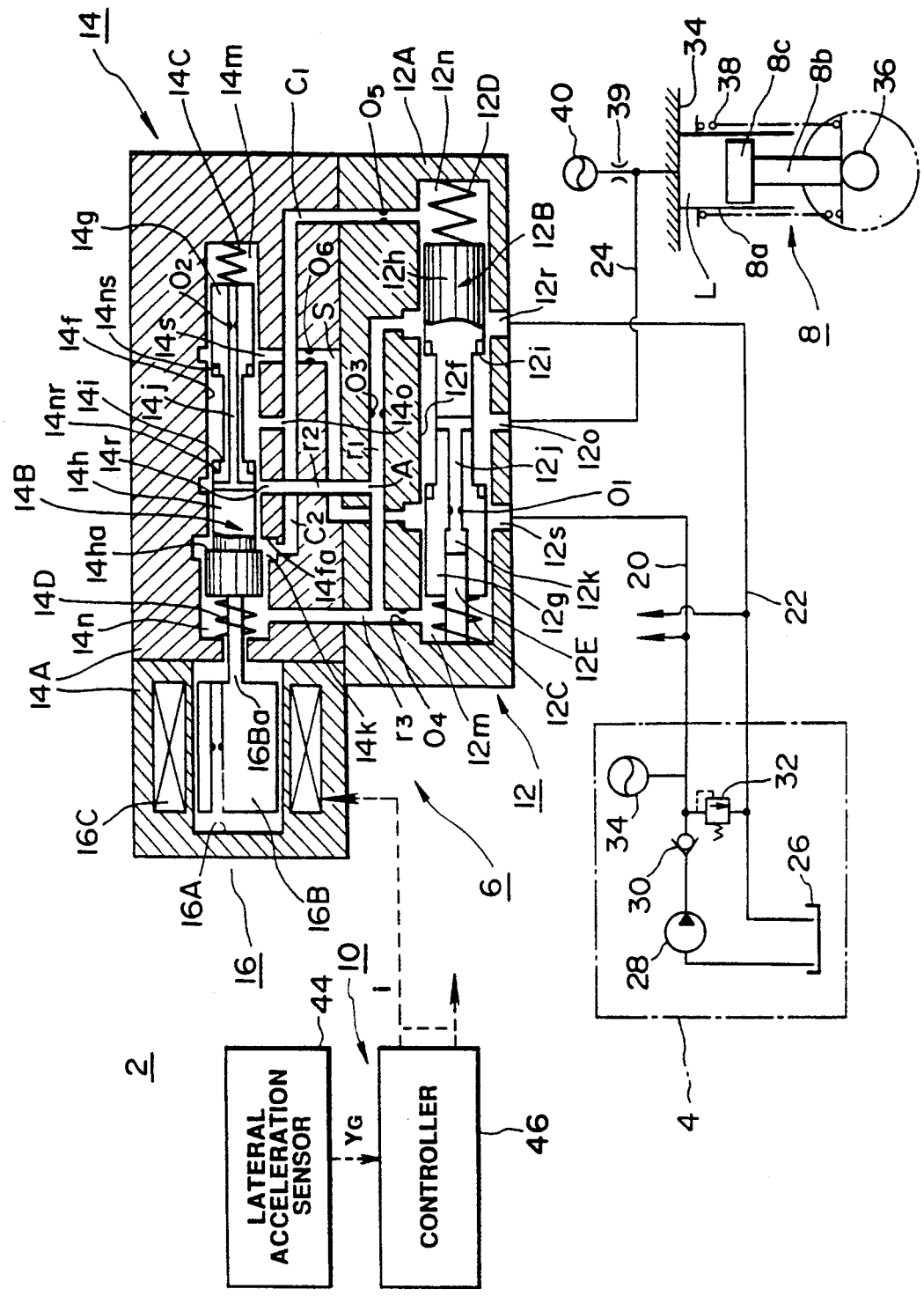
FIG. 5 is block diagram which shows an active suspension control system incorporating a pressure control valve of an alternative embodiment according to the present invention.

Referring to FIG. 5, there is shown an alternative embodiment of the present invention. The like reference numbers refer to like parts in FIG. 1 and explanation thereof will be omitted in detail.

The system of this embodiment is different from the above first embodiment in that an orifice 06 is arranged at a portion of a hydraulic passage s connecting between a supply port 12s of a main valve 12 and a supply port 14s of a pilot valve 14, and notches 14ns and 14nr of a pilot spool 14B at supply and return port sides are equal to each other in diameter and number so that variation rates of opening areas defined by the pilot supply port 14s and the pilot return port 14r, dependent upon displacement of the pilot spool 14B, are equal to each other. Other arrangements are the same as the above first embodiment.

The above equation (5) regarding the flow gain $K_{xp}'$ when increasing a pilot pressure is shown below again for the sake of explanation of reasons for providing the orifice 06.

$$K_{xp} = C\left(\frac{2}{\rho}\right)^{\frac{1}{2}} \cdot \frac{\partial S_s(X)}{\partial X_p} \cdot (P_s - P_c/\alpha)^{\frac{1}{2}}$$

From the above equation, it will be appreciated that when a supply pressure $P_s$ to the pilot valve 14 is reduced, only the pressure increasing flow gain is lowered.

Accordingly, in this embodiment, the orifice 06 is disposed in the internal hydraulic passage s directed to the pilot supply port 14s to decrease a supply pressure $P_s$ to the pilot valve 14 by fluid resistance created thereby.

With these arrangements, even when variation rates of opening areas defined by the pilot supply port 14s and the pilot return port 14r relative to displacement of the pilot spool 14B are the same, the supply pressure $P_s$ to the pilot valve 14 is effectively reduced below a preselected pressure level (i.e., a flow rate of a working fluid supplied to the pilot valve through the supply port is decreased below a preselected degree). For these reasons, absolute values of the flow gains $K_{xp}'$ when increasing and decreasing pilot pressure are balanced with each other. It will be appreciated that the same operation and effect are obtained as the above first embodiment.

While the system of the invention, as described above, utilizes a hydraulic fluid for suspension control, air is alternatively available as a working fluid for a suspension actuator. Further, the system of the invention is suitable for pitching or bouncing motion control as well as rolling motion control.

What is claimed is:
1. A pressure control valve for adjusting a controlled pressure for an actuator comprising:
   a first valve for providing a controlled pressure to the actuator, said first valve including supply, output, and return ports, the supply and return ports being adapted to be communicated with a fluid pressure source, the output port being adapted to be communicated with the actuator, said first valve further including a spool in a valve bore thereof and first and second pressure chambers, the spool being arranged at first or second spool positions according to a pressure level difference between the first and second pressure chambers, the first spool position communicating between the supply and output ports for modifying a pressure level of a working fluid supplied from the fluid pressure source to elevate the controlled pressure to the actuator, the second spool position communicating between the output and return ports for discharging pressure output from the output port through the return port to reduce the controlled pressure to the actuator,
   a second valve providing a pilot pressure for activating said first valve, said second valve including pilot supply, output, and return ports, the pilot supply and return ports being communicated with the supply and return ports of said first valve, the pilot output port being communicated with the first pressure chamber of said first valve, said second valve further including a pilot spool in a valve bore thereof which is responsive to a control signal output from a controller to be arranged at first or second pilot spool positions, the pilot spool being responsive to the control signal commanding elevation in the controlled pressure to be arranged at the first pilot spool position to communicate between the pilot supply and output ports to receive working fluid from the fluid pressure source at a first flow rate through the pilot supply port for providing pilot pressure increased toward a first preselected level at a first flow gain to the first pressure chamber of said first valve through the pilot output port to arrange the spool of said first valve at the first spool position to provide controlled pressure elevated dependent upon the first preselected level of the pilot pressure, the pilot spool being further responsive to the control signal commanding reduction in the controlled pressure to be arranged at the second pilot spool position to communicate between the pilot output and return ports to discharge the working fluid output from the pilot output port at a second flow rate through the pilot return port for providing pilot pressure decreased toward a second preselected level at a second flow gain to the first pressure chamber of said first valve to arrange the spool of said first valve at the second spool position to provide controlled pressure decreased dependent upon the second preselected pilot pressure level; and
   means for providing the first flow rate of the working fluid supplied through the pilot supply port smaller than the second flow rate of the working fluid discharged from the pilot return port for balancing the first and second flow gains with each other for providing uniform response in elevation and reduction of controlled pressure to the actuator.

2. A pressure control valve as set forth in claim 1, wherein the pilot spool of said second valve is responsive to the control signal commanding the elevation in the controlled pressure to be displaced in a first direction from a third pilot spool position where the pilot spool blocks both pilot supply and return ports to open the pilot supply port by a first opening area at the first pilot spool position to establish the communication between the pilot supply and output ports and responsive to the control signal commanding the reduction in the controlled pressure to be displaced in a second direction opposite the first direction from the third pilot position to open the pilot return port by a second opening area at the second pilot spool position to establish the communication between the pilot return port and output port, said means being adapted to provide a variation rate in the first opening area relative to the displacement of the pilot spool in the first direction smaller than that in the second opening area relative to the displacement of the pilot spool in the second direction.

3. A pressure control valve as set forth in claim 2, wherein said means includes first and second notches formed in the pilot spool, the first notch interfacing with the pilot supply port according to the displacement of the pilot spool in the first direction, the second notch interfacing with the pilot return port according to the displacement of the pilot spool in the second direction, the first notch being smaller in size than the second notch.

4. A pressure control valve as set forth in claim 3, wherein the pilot spool includes first and second lands formed at end portions thereof respectively and a cylindrical groove formed between the first and second lands, the pilot spool being arrangeable at the third pilot spool position wherein the first and second lands block the supply and return ports respectively and further arrangeable at the first and second pilot spool positions wherein the cylindrical groove allows the communication between the pilot output port and the pilot supply port and the communication between the pilot output port and the pilot return port, the first and second notches being respectively formed at edge portions of the first and second lands adjacent to the cylindrical groove.

5. A pressure control valve as set forth in claim 2, wherein said means includes a plurality of first and second notches formed in the pilot spool, the first notches interfacing with the pilot supply port according to the displacement of the pilot spool in the first direction, the second notches interfacing with the pilot return port according to the displacement of the pilot spool in the second direction, the first notches being smaller in number than the second notches.

6. A pressure control valve as set forth in claim 1, wherein said means includes an orifice which is disposed between the supply port of said first valve and the pilot supply port of said second valve for restricting the first flow rate below a preselected degree.

7. A pressure control valve as set forth in claim 1, wherein the pilot spool of said second valve is responsive to the control signal commanding the elevation in controlled pressure to be displaced in a first direction from a third pilot spool position where the pilot spool blocks both pilot supply and return ports to open the pilot supply port by a first opening area at the first pilot spool position to establish the communication between the pilot supply and output ports and responsive to the control signal commanding the reduction in controlled pressure to be displaced in a second direction opposite the first direction from the third pilot position to open the pilot return port by a second opening area equal to the first opening area at the second pilot spool position to establish the communication between the pilot return port and output port, said means including an orifice which is disposed between the supply port of said first valve and the pilot supply port of said second valve for restricting the first flow rate below a preselected degree.

8. A pressure control valve as set forth in claim 1, further comprising an orifice which is disposed in a fluid passage connecting the return port of said first valve and the pilot return port of said second valve.

9. A pressure control valve as set forth in claim 8, wherein the first pressure chamber of said first valve is defined by an end of the spool in the valve bore, the second pressure chamber being communicated with the output port and further communicated with the supply and return port according to displacement of the spool caused by pilot pressure acting on the end of the spool in the first pressure chamber, said first valve further including a third pressure chamber defined by the other end of the spool in the valve bore which is communicated with the return port of said first valve and the pilot return port of said second valve through a second fluid passage, the second fluid passage being connected to the fluid passage connecting the return port and the pilot return port, at a position close to the pilot return port.

10. A pressure control valve as set forth in claim 9, wherein the second pressure chamber of said first valve is defined in the spool.

* * * * *